(No Model.)
W. LOUGHRIDGE.
Pistons for Air Brake Cylinders.
No. 234,134. Patented Nov. 9, 1880.
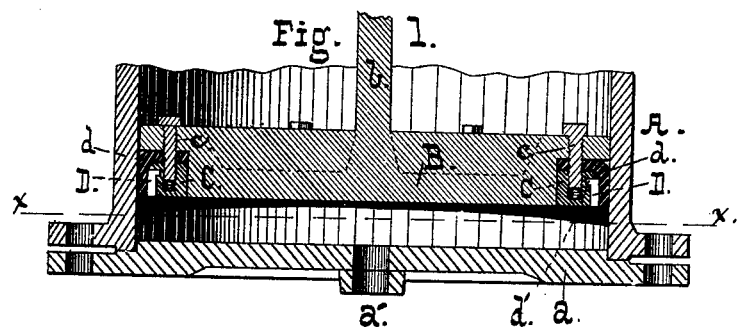
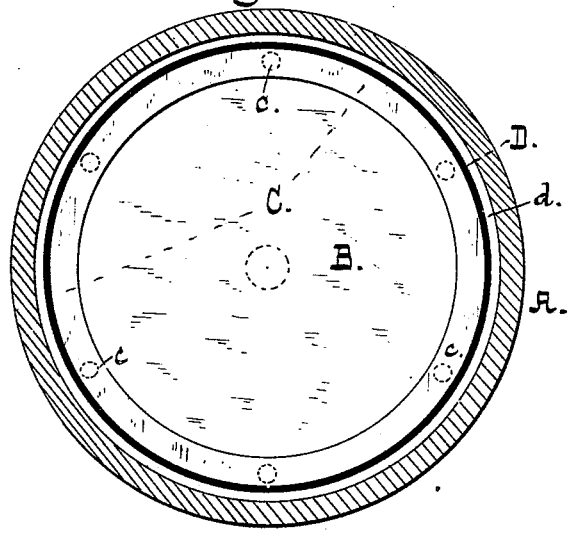
Witnesses,
W. A. Bertram
D. H. Barclay.
Inventor,
WILLIAM LOUGHRIDGE
by R. D. Williams.
Attorney.
N. PETERS, PHOTO-LITHOGRAPHER, WASHINGTON, D. C.

UNITED STATES PATENT OFFICE.

WILLIAM LOUGHRIDGE, OF BALTIMORE, MARYLAND.

PISTON FOR AIR-BRAKE CYLINDERS.

SPECIFICATION forming part of Letters Patent No. 234,134, dated November 9, 1880.

Application filed April 8, 1880. (No model.)

*To all whom it may concern:*

Be it known that I, WILLIAM LOUGHRIDGE, of Baltimore city, State of Maryland, have invented certain new and useful Improvements in Pistons for Air-Brake Cylinders; and I hereby declare the same to be fully, clearly, and exactly described as follows, reference being had to the accompanying drawings, in which—

Figure 1 is a transverse sectional view of the cylinder, and Fig. 2 a plan view of the piston and sectional view of cylinder on line $x$ $x$, Fig. 1.

My invention has reference to the cylinders used with pneumatic brake mechanism, and it has for its objects to prevent leakage of air between the piston and walls of the cylinder and to afford facility for taking up the wear of the packing, as hereinafter fully set forth, the said objects being attained by certain peculiarities of construction, which render the device applicable for use in other connections than the particular one referred to.

In the accompanying drawings, A is the cylinder, having a flanged end, to which the head $a$ is bolted in the usual way. An air-inlet, $a'$, is formed in the head $a$.

B is the piston, to which is affixed the piston-rod $b$, and $d$ is a cup-shaped leather or equivalent washer or packing lying in a groove in the periphery of the piston, where it is held by means of a ring, C, secured to the piston by a series of bolts, $c$. Between this ring and the packing is interposed a ring, D, of lead or equivalent malleable material. This ring has a flange, $d'$, which engages with a groove in the ring C. It is conveniently formed by rolling the lead into the form of a ribbon or strip having the cross-section shown, and cutting off a sufficient length to form the complete ring, which is then applied to the edge of the ring C, and the latter laid in place on the packing and secured by the bolts $c$.

The flange $d'$ prevents the ring D from becoming displaced.

As the packing $d$ wears away and becomes loose the wear may readily be taken up by removing the piston or cylinder-head and hammering upon the face of the malleable ring D with any suitably-shaped instrument, one whose edge is curved to conform to the curvature of the ring being preferred. In this way wear may readily be taken up until the packing is completely worn out.

Instead of being made in the form of a ring, the part C may be a complete disk, and in lieu of securing the ring D by means of the flange $d'$, the ring may be made tapering in cross-section, the periphery of the ring C (or disk, as the case may be) being beveled to conform thereto.

The piston, being preferably plane on the face next the cylinder-head, may be brought fairly in contact with it, whereby, in using the device in connection with a pneumatic brake mechanism, economy of the compressed air results.

I am aware that it is not new to secure a cup-shaped packing in a piston by means of a ring bolted to the piston, and that springs have been used to hold the packing against the walls of the cylinder. Such I do not claim.

What I claim is—

1. The combination, with the cylinder and piston, of the annular packing and malleable ring contiguous thereto, as and for the purpose set forth.

2. In combination with the piston and cylinder, the packing $d$, ring C, and malleable ring D, as set forth.

3. In combination with the cylinder and piston, the ring C, bolted to the latter and securing the packing and malleable ring D, as set forth.

4. In combination with the cylinder and piston, the cup-shaped packing $d$, grooved ring C, flanged ring D, and bolts $c$, as set forth.

WILLIAM LOUGHRIDGE.

Witnesses:
JOHN C. GITTINGER,
R. D. WILLIAMS.